(No Model.)
C. B. TRUMBLE.
ANIMAL TRAP.
No. 481,707. Patented Aug. 30, 1892.
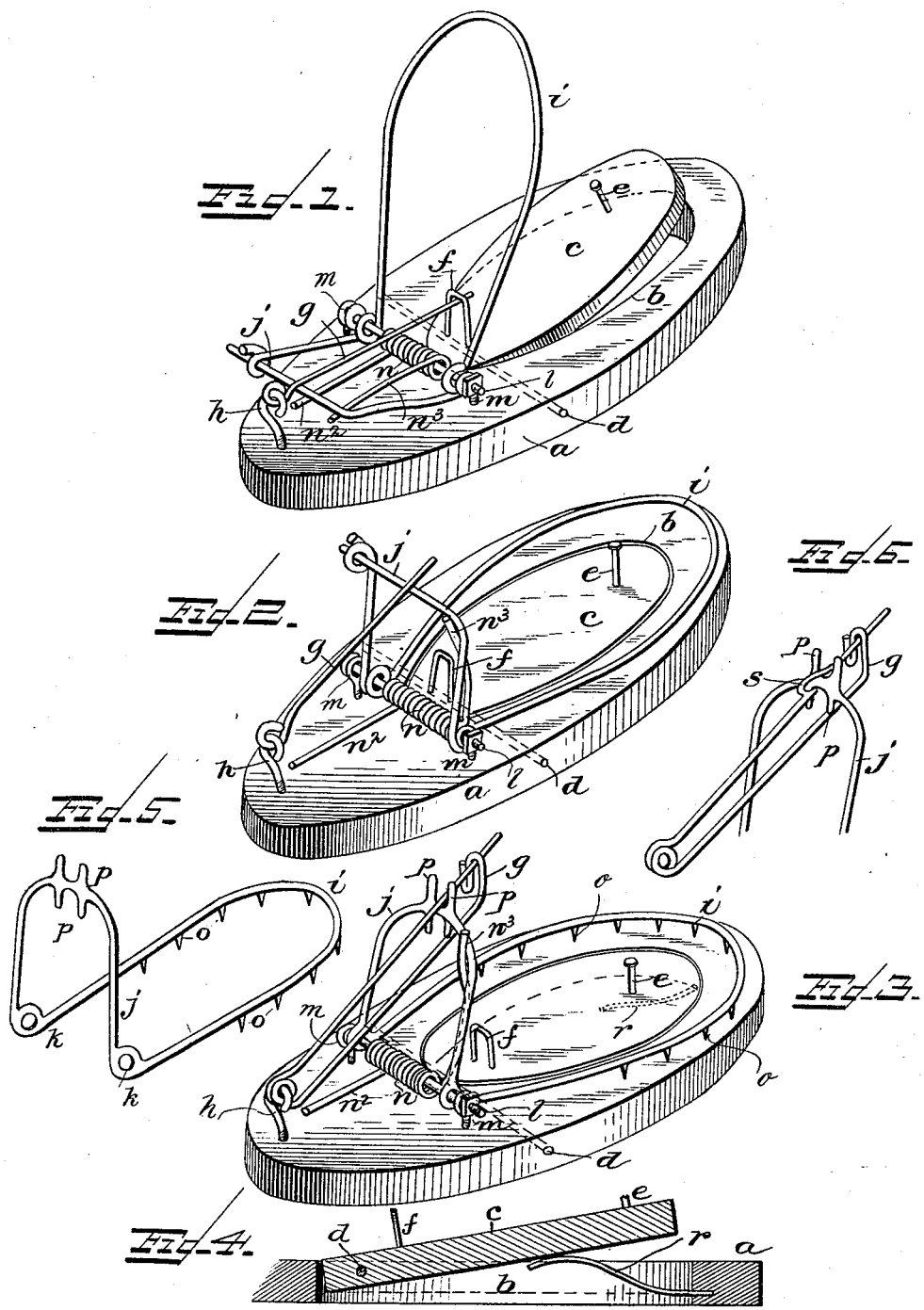
WITNESSES
INVENTOR
Chauncey Burdett Trumble
by Wm N Finckel
his Attorney

UNITED STATES PATENT OFFICE.

CHAUNCEY BURDETT TRUMBLE, OF GROTON, NEW YORK, ASSIGNOR, BY MESNE ASSIGNMENTS, OF ONE-HALF TO HIRAM G. MOE, OF SAME PLACE.

ANIMAL-TRAP.

SPECIFICATION forming part of Letters Patent No. 481,707, dated August 30, 1892.

Application filed January 23, 1892. Serial No. 419,002. (No model.)

*To all whom it may concern:*

Be it known that I, CHAUNCEY BURDETT TRUMBLE, a citizen of the United States, residing at Groton, in the county of Tompkins and State of New York, have invented a certain new and useful Improvement in Animal-Traps, of which the following is a full, clear, and exact description.

This invention relates to traps for catching and killing vermin, such as rats.

The object of the invention is to provide an efficient trap having as few parts as possible and with a compact and strong arrangement of these parts, so that the trap may be manufactured and sold cheaply and do its work effectively.

My trap comprises a base-piece or lower stationary jaw which is provided with a bait receiver or pan, combined with a spring jaw or drop and a trigger for setting the bait-receiver and spring-jaw and for releasing the spring-jaw when an animal meddles with the bait, the construction and operation being as I will proceed now more particularly to set forth and finally claim.

In the accompanying drawings, illustrating my invention, in the several figures of which like parts are similarly designated, Figure 1 is a perspective view of the trap set. Fig. 2 is a similar view of the trap out of use. Fig. 3 is a perspective view of the trap, showing modifications of the trigger and pan. Fig. 4 is a perspective view of a cast spring-jaw. Fig. 5 is a longitudinal section of part of the lower jaw and pan of Fig. 3, and Fig. 6 is a perspective view of another form of trigger.

The letter $a$ designates the base-piece or lower stationary jaw, which may be of wood or heavier material provided with an opening $b$, in which is arranged a bait-pan $c$, a pin $d$ being passed transversely through the lower jaw and pan to unite them. On this pin $d$ the pan has a pivotal movement. The bait hook or pin $e$ may be of any approved form.

$f$ is a loop on the pan, which serves as a detent for the trigger $g$, and this trigger is secured to the lower jaw by a screw-eye or other fastening $h$. The spring or movable jaw is composed of the front or active portion $i$ and the back or manipulating portion $j$, these parts being arranged substantially at right angles and provided at their angles with holes $k$ to receive the pivot pin or bolt $l$. The pivot pin or bolt is secured to the lower jaw by screw-eyes or other fastenings $m$. A coiled spring $n$ is arranged upon the pivot pin or bolt and has one arm $n^2$ bearing upon the lower jaw and the other arm $n^3$ bearing upon the back and exerting the force of the spring to impel the spring-jaw toward the base or lower jaw for catching and killing the animal.

In Figs. 1 and 2 the spring-jaw is shown as composed of wire bent to shape and coiled to form the pivot-bolt holes and having its ends united by lapping one around the other. In Figs. 3 and 4 the spring-jaw is shown as a casting, and a malleable casting is preferred.

The spring-jaw may be provided with teeth or pointed projections $o$, as in Figs. 3 and 4, for impaling the animal.

The trigger may be made as a sort of safety-pin, as shown in Fig. 3, for permanently engaging the back $j$ of the spring-jaw, and in such case said back may be provided with guards $p$ on one or both sides for keeping the trigger in place, and as such a trigger will automatically engage the detent $f$, I prefer to use a spring $r$ for automatically raising the pan and permitting it to yield as the trigger descends to engage the detent to carry the detent beyond the end $g^2$ of the trigger and then let said detent slip back over such trigger and so engage it.

In Fig. 6 I have shown a further modification of the trigger, and although I illustrate the safety-pin trigger the feature of the notch or offset $s$ in this form of my invention is equally applicable to the trigger shown in Figs. 1 and 2 and to other triggers that may be used. The purpose of this offset is to lock the jaw in closed position, so as to prevent an entrapped animal from raising the jaw and escaping. To this end the offset engages the back of the jaw and prevents the jaw from being raised. One or more of these offsets may be applied to the trigger. By reason of this self-locking feature a lighter spring may be used and a corresponding economy in the production of the traps obtained.

To set the trap shown in Figs. 1 and 2, the front portion $i$ is raised by bearing backwardly and downwardly upon the back *j*, and when said back is down the trigger *g* is passed over and above it and engaged with the detent *f*. In order so to engage the detent and trigger, the pan must be raised a little, and hence when an animal exerts pressure upon the pan the said pan descends, thereby disengaging the detent and trigger and releasing the spring-jaw, which is then subject to the unrestrained force of the spring.

It will be seen that the trap may be set without necessity for handling the dangerous active portion of the jaw, and may be set with one hand. To further increase the facility of setting, the safety-pin trigger, Fig. 3, is used, for it will be observed that this trigger is in constant and permanent engagement with the jaw's back, and to this extent makes the trap self-setting.

While I have shown and described a trap employing a bait-receiving pan in connection with the spring-jaw, I do not limit my invention thereto, but mean to include any and all forms of bait-receiving devices which are capable of use directly or indirectly in connection with the spring-jaw.

What I claim is—

1. An animal-trap comprising a stationary jaw, a bait-receiving device, a movable spring-jaw pivoted to the stationary jaw and having a rigid integral back piece by which it may be set, and a trigger secured to the stationary jaw and adapted to be laid over the back piece to engage the bait-receiving device to set the trap, substantially as described.

2. In an animal-trap, a spring-jaw having a front portion constructed to catch and kill animals and a back piece arranged substantially at right angles to the front portion and integral therewith, combined with a base or lower stationary jaw to which the spring-jaw is pivoted, a spring constructed independently of the two jaws and interposed between the two jaws, and a trigger for setting the spring-jaw, substantially as described.

3. In an animal-trap, a movable jaw composed of an active portion provided with a right-angled back portion integral with the active portion and by which the active portion may be manipulated and having pivot-holes, combined with a pivot, a spring for the jaw, a trigger, a stationary jaw, and a baiting device, substantially as described.

4. In an animal-trap, a movable jaw composed of an active portion having a right-angled back portion integral therewith for manipulating the jaw, combined with a pivot fitted to pivot-holes in the movable jaw, a spring for closing the jaw forcibly, a trigger connected and moving with the back portion, a stationary jaw, a baiting device, and a spring normally moving the baiting device toward the movable jaw, substantially as described.

5. In an animal-trap, a stationary jaw having a suitable baiting device and trigger, combined with a movable spring-jaw having an active portion and an integral and rigid right-angled back or manipulating portion and pivoted to the stationary jaw, substantially as described.

6. An animal-trap comprising a stationary jaw, a bait-receiving device, a movable spring-jaw pivoted to the stationary jaw and having a back piece by which it may be set, and a trigger secured to the stationary jaw and adapted to be laid over the back piece and engage the bait-receiving device to set the trap and having a notch or offset to engage the back piece when the trap is sprung to lock the movable jaw and prevent its victim from raising it, substantially as described.

7. An animal-trap comprising a stationary jaw, a bait-receiving device, a movable spring-jaw pivoted to the stationary jaw and having a back piece by which it may be set, and a trigger permanently engaged with the back piece and adapted to be extended over it when it is prone into engagement with the bait-receiving device to set the trap and having a notch or offset to engage the back piece when the trap is sprung to lock the movable jaw and prevent its victim from raising it, substantially as described.

8. An animal-trap comprising a stationary jaw, a bait-receiving device, a movable spring-jaw pivoted to the stationary jaw and having a back piece by which it may be set, and a trigger permanently engaged with the back piece and adapted to be extended over it when it is prone into engagement with the bait-receiving device to set the trap, substantially as described.

In testimony whereof I have hereunto set my hand this 18th day of January, A. D. 1892.

CHAUNCEY BURDETT TRUMBLE.

Witnesses:
HIRAM G. MOE,
MILLARD C. MARSH.